United States Patent Office 3,425,960
Patented Feb. 4, 1969

3,425,960
POLYGLYCIDOL PROCESS
Stanley Robert Sandler, Springfield, and Florence Ray Berg, Philadelphia, Pa., assignors to The Borden Company, New York, N.Y., a corporation of New Jersey
No Drawing. Filed Sept. 2, 1965, Ser. No. 484,762
U.S. Cl. 260—2                                      4 Claims
Int. Cl. C08g 23/06, 23/12

ABSTRACT OF THE DISCLOSURE

This invention relates to the method of preparing polymers of epoxidized $C_3$–$C_6$ straight chain alcohols by the use of a catalyst selected from the group consisting of alkali metal hydroxides, alkali metal amides, $C_1$–$C_4$ alkali metal alkoxide, alkyl and aryl tertiary amines and mixtures thereof at a temperature in the range of about 0°–30° C.

---

It is known that certain materials will catalyze glycidol polymerization. For example, organometallic compounds of Group II or III metals such as triethyl aluminum have been described as having some catalytic activity in this area. These reactions, however, require elevated temperatures in addition to catalyst for polymerization to be induced. The instant invention avoids the necessity of elevated temperature polymerization of the prior art.

The instant invention provides a new method for preparing the polyethers without the necessity of high temperature polymerization.

The invention comprises the method for preparing polymers of epoxidized $C_3$–$C_6$ straight-chain alcohols. Polymerization according to the invention, is carried out in the presence of catalysts which include alkali metal hydroxides and amides, $C_1$–$C_4$ alkoxides of alkali metals and tertiary amines. Particularly well suited are the alkali metal alkoxides. The polymerization reaction is described by the following structural formula:

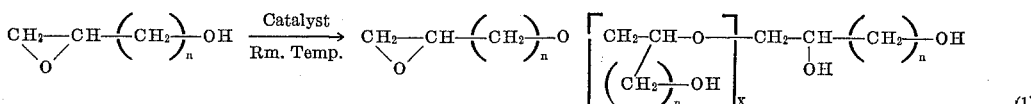

wherein $n$ is an integer in the range 1–4; and $x$ is about at least 4 and greater. To the extent that catalyst is present in the polymerization reaction medium, the basic catalyst fragment (i.e., —OCH$_3$, —OH, —(R)$_3$N, etc., wherein R represents substituent moieties on the nitrogen atom of the tertiary amine catalyst) may replace hydrogen on the straight chain, as for example:

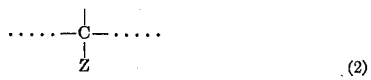

wherein Z represents basic catalyst fragment. The structure is intended to describe the preferred reactant, namely an epoxidized straight-chain alcohol having terminal hydroxy and epoxy groups.

As to materials, the monomeric unit is an epoxidized $C_3$–$C_6$ straight-chain alcohol. It is preferred that the hydroxy group of the alcohol be terminal. Examples of the preferred epoxidized alcohols include monoepoxy substituted straight-chain alkanols and alkenols containing between 3–6 carbon atoms and having the epoxy group in the terminal position. Within this group, 2,3-epoxypropanol is preferred. Other examples of suitable epoxidized alcohols include 3,4-epoxybutanol, 4,5-epoxypentanol, 5,6-epoxyhexanol, epoxidized hexenol and the like.

The catalyst useful in the practice of this invention is selected from the group consisting of alkali metal hydroxides and amides, $C_1$–$C_4$ alkoxides of alkali metals and tertiary amines. Examples of said hydroxides and amides include sodium hydroxide, potassium hydroxide, sodium amide, lithium amide and the like. The alkoxides include, as for example, sodium methoxide, potassium ethoxide, lithium isopropoxide, cesium n-butoxide, sodium tertiary butoxide and potassium tertiary butoxide. Although four carbon alkoxides are preferred as a maximum for the catalytic purposes of this invention, higher alkoxides could be used but with decreasing efficiency. No beneficial effect is to be noted when, for example, sodium hexoxide is used as a catalyst; in fact, higher alkoxides tend merely to dilute the strength of the catalyst, thereby increasing the proportion required.

The tertiary amine catalyst may include alkyl and aryl moieties and mixtures thereof which may be represented as:

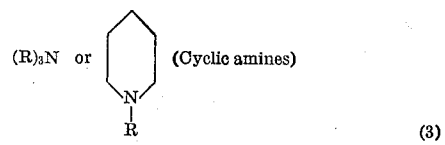

wherein R represents, as above, substituent moieties on the nitrogen atom of the tertiary amine. Examples of the tertiary amines include pyridine, picoline, triethylamine, tributylamine, trioctylamine, triphenylamine, ethyl diphenylamine and the like.

As to proportions, the catalyst is used in proportion of at least .05% on the weight of the epoxidized alcohol. We have found that the percentage conversion to the polymer described, reaches an asymptotic pleteau at proportions of preferred catalyst of about 1% on the weight of the epoxidized alcohol. As is usual with catalysts, reaction rates increase as the proportion of catalyst is increased. It has been found that proportions of catalyst greater than 1% accelerates polymerization to an uncontrollable rate. Therefore, catalyst proportions greater than 1% are regarded as unnecessary and an economic waste. Below

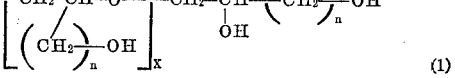

.05% catalyst, the percent conversion to the polymer is negligible.

As to reaction conditions, the catalyst is admixed with epoxidized alcohol; the temperature is maintained in the range of between about 0°–30° C. and preferably between 15°–25° C. Polymerization is initiated and proceeds upon contact of epoxidized alcohol and catalyst. Reaction time is about 24 hours at room temperature using 1% catalyst; conversion is about 80–90%. In order to terminate the polymerization reaction, an acid source is introduced into the reaction system, as for example, mineral acids such as HCl, H$_2$SO$_4$, organic acids such as p-toluene sulfonic acid or the hydrogen-form of cation exchange resins. Isolation of the polymer may be accomplished by dissolving the reaction product in an appropriate solvent, as for example, methyl alcohol, dimethylformamide, dimethylacetamide or dimethyl sulfoxide; filtering off the solids, including the ion exchange resins; and thereafter distilling away unreacted materials.

It is believed that branch-chained epoxidized alcohols cause steric interference to such degree that the particular catalysts are ineffective to initiate and promote polymerization of non-straight chain epoxidized alcohols. For example, 2-ethyl-2,3-epoxyhexanol, was admixed with catalysts herein described and the percentage conversion was measured after as much as 53 hours of mixing time. Runs were made at various temperature ranges as between 20°

C. and 50° C. Only 1% was converted to the polymer after 53 hours in the presence of triethylamine, and 30% was converted to the polymer after 20 hours in the presence of sodium methoxide. The following table shows the effectiveness of the herein described catalyst as seen from the percentage conversion column. Although we believe that experimental data support this conclusion, it is not intended that this invention be bound by the explanation.

TABLE 1

| Reactant | Catalyst [1] | Time (hrs.) | Conversion, percent |
|---|---|---|---|
| 2,3-epoxypropanol | KOH | .67 | 28 |
| | | 3 | 53 |
| | | 22.5 | 89 |
| Do | NaOCH$_3$ | .33 | 22 |
| | | 2.5 | 58 |
| | | 20 | 87 |
| | | 27 | 90 |
| | | 92 | 89 |
| Do | (CH$_3$CH$_2$)$_3$N | 19.5 | 73 |
| | | 26.5 | 79 |
| | | 44 | 81 |
| | | 70 | 92 |
| | | 94 | 90 |
| 2-ethyl-2,3-epoxy-hexanol [2] | NaOCH$_3$ | .33 | 0 |
| | | 2.5 | 0 |
| | | 20 | 30 |
| Do [2] | (CH$_3$CH$_2$)$_3$N | 53 | 1 |

[1] Catalyst proportion was at least 1% on the weight of the alcohol.
[2] The 2-ethyl-2,3-epoxyhexanol forms no part of this invention.

In the examples that follow and elsewhere herein, proportions are expressed as parts by weight unless specifically stated to the contrary.

Example I

Catalyst herein described was stirred into 2,3-epoxypropanol (glycidol). The temperature was maintained at about 23° C. with a water bath during addition and the ensuing polymerization. Samples were removed at intervals, weighed, dissolved in solvent, and neutralized with an acid source material such as hydrogen-form cation exchange resin. The mixture was filtered, distilled at about 140° C. at 0.5 mm. Hg, and weighed to determine the loss of non-polymerized 2,3-epoxypropanol. The weight difference was the weight of polymer made.

Comparison of the infrared spectrum of the product made as in Example I and the spectrum of known polyglycidol showed identical curves.

The following table presents the results obtained for the different catalysts used.

TABLE II

| Catalyst | Weight, percent | Time (hrs.) | Conversion percent |
|---|---|---|---|
| KOH | 1 | 22.5 | 89 |
| NaOCH$_3$ | 1 | 20 | 87 |
| NaOCH$_3$ | .3 | 20 | 53 |
| NaOCH$_3$ | .3 | 140 | 100 |
| LiOH | 1 | 72 | 84 |
| NaOH | 1 | 72 | 81 |
| NaNH$_2$ | 1 | 72 | 82 |
| (CH$_3$CH$_2$)$_3$N | 1 | 19.5 | 73 |
| Pyridine | 1 | 25 | 78 |

Longer polymerization had the effect of increasing the percent conversion as for example, after 70 hours, conversion to polymer using triethylamine was 92% and 84% after 97 hours using pyridine. The molecular weight of the polyglycidol corresponds to at least 4 repeating units in the polymer. Experimental determination of molecular weight for NaOCH$_3$ catalysis of glycidol at .3% for 116 hours showed the molecular weight to be 445. Higher catalyst proportions give higher molecular weight polymers.

Example II

In one series, in order to determine the effect of the hydroxy group in the molecule, a pure epoxy compound, propylene oxide, was substituted for 2,3-epoxypropanol in the method of Example I. Catalyst in proportion up to 10% on the weight of propylene oxide was used. Little or no polymerization was noted, i.e., 33% conversion with KOH after 51 hours, and no conversion with NaOCH$_3$, LiOH and NaOH after 72 hours. Note is taken of the lack of polymerization at room temperature of a compound similar to the epoxidized alcohol using the same catalyst.

Example III

The method and materials of Example I are used except that the 2,3-epoxypropanol used therein is replaced separately and in turn by the epoxidized straight-chain alcohols herein disclosed. Polyethers corresponding to the particular epoxy-alcohol (see Reaction 1, above) are obtained.

Example IV

The method and materials of Examples I and III are used except that the catalysts used therein are replaced separately and in turn by the other catalysts herein disclosed and in proportion of 0.05%–1.0% on the weight of the epoxidized straight-chain alcohol. Polyethers corresponding to the particular epoxy-alcohol (see Reaction 1, above) are obtained. Polymer conversion, however, is reduced in the lower range of catalyst concentration.

The polyethers are useful in making adhesives and molding compounds.

It will be understood that it is intended to cover all changes and modifications of the examples of the invention herein chosen for the purpose of illustration which do not constitute departures from the spirit and scope of the invention.

We claim:

1. The process of making polyether by polymerizing epoxidized alcohol at moderate temperature comprising the steps of:
   (1) admixing epoxidized alcohol selected from the group consisting of C$_3$–C$_6$ epoxidized straight-chain alkanol and alkenol, with a catalyst selected from the group consisting of:
      (a) alkali metal hydroxide,
      (b) alkali metal amide,
      (c) C$_1$–C$_4$ alkali metal alkoxide, and
      (d) alkyl and aryl tertiary amine and mixtures thereof, the proportion of said catalyst being at least .05% on the weight of said alcohol,
   (2) maintaining the temperature in the range of 0°–30° C., and
   (3) terminating polymerization by addition of an acid source material.

2. The process of claim 1 wherein:
   (1) said alcohol contains terminal hydroxy and epoxy groups, (2) the proportion of said catalyst being in the range of .05–10% on the weight of said alcohol, and
(3) maintaining said temperature in the range of 15°–25° C.

3. The process of claim 2 wherein:
(1) said alkoxide is selected from the group consisting of sodium methoxide, potassium methoxide, potassium ethoxide, sodium tertiary butoxide and potassium tertiary butoxide,
(2) said tertiary amine is selected from the group consisting of triethylamine, tributylamine, triphenylamine and ethyl diphenylamine, and
(3) said acid source is selected from the group consisting of mineral acids, organic acids and hydrogen-form cation exchange resins.

4. The process of claim 2 wherein:
(1) said alcohol is 2,3-epoxypropanol,
(2) said catalyst is sodium methoxide, and
(3) said acid source is hydrogen-form cation exchange resin.

OTHER REFERENCES

Chemical Abstracts, vol. 59, November 1963 (p. 12,946d relied on).

WILLIAM H. SHORT, *Primary Examiner.*

T. PERTILLA, *Assistant Examiner.*

U.S. Cl. X.R.

260—615, 348